United States Patent [19]

Ragle et al.

[11] 4,417,289

[45] * Nov. 22, 1983

[54] JACKET FOR FLOPPY PACK

[75] Inventors: Herbert U. Ragle, Thousand Oaks; Dean DeMoss, Camarillo, both of Calif.

[73] Assignee: Burroughs Corporation, Detroit, Mich.

[*] Notice: The portion of the term of this patent subsequent to Jan. 9, 1996 has been disclaimed.

[21] Appl. No.: 230,217

[22] Filed: Feb. 2, 1981

Related U.S. Application Data

[63] Continuation of Ser. No. 1,978, Jan. 8, 1979, abandoned, which is a continuation-in-part of Ser. No. 711,579, Aug. 4, 1976, Pat. No. 4,134,144.

[51] Int. Cl.³ .................. G11B 23/02; G11B 25/04
[52] U.S. Cl. .................................. 360/98; 360/99; 360/133
[58] Field of Search .................... 360/97–99, 360/133

[56] References Cited

U.S. PATENT DOCUMENTS

| 4,134,143 | 1/1979 | Ragle et al. | 360/133 X |
| 4,134,144 | 1/1979 | Ragle et al. | 360/98 X |
| 4,152,739 | 5/1979 | DeMoss et al. | 360/98 |

Primary Examiner—John H. Wolfe
Attorney, Agent, or Firm—John J. McCormack; Nathan Cass; Kevin R. Peterson

[57] ABSTRACT

An improved "floppy cartridge" is described comprising a jacket especially adapted for containing a pack of flexible disks, this jacket accommodating convenient insertion and withdrawal of the disk pack, while also permitting rotation and associated partitioning of the pack, as well as head-insertion and transducing on a selected disk—all with the pack kept contained within the jacket.

15 Claims, 19 Drawing Figures

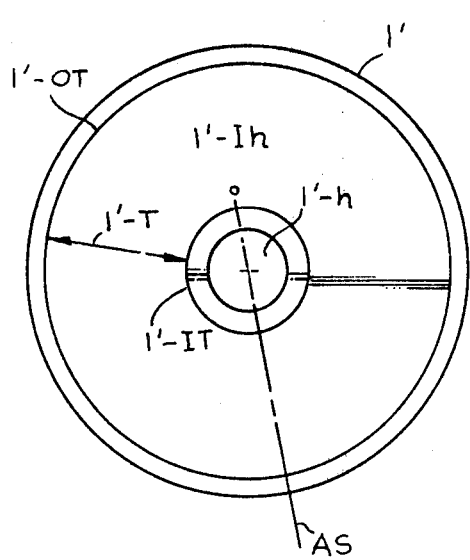
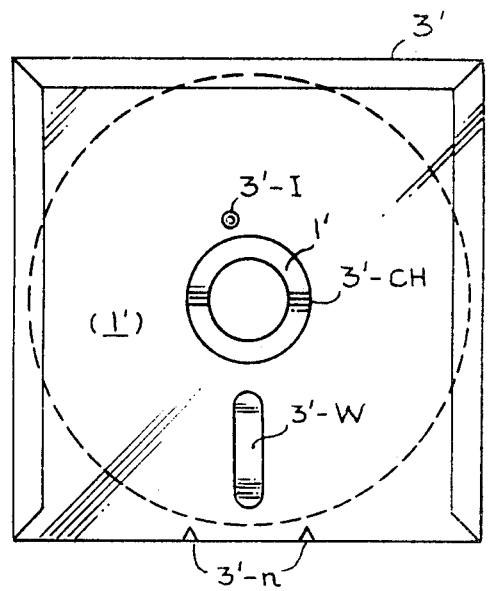
PRIOR ART
Fig. 1
Fig. 2
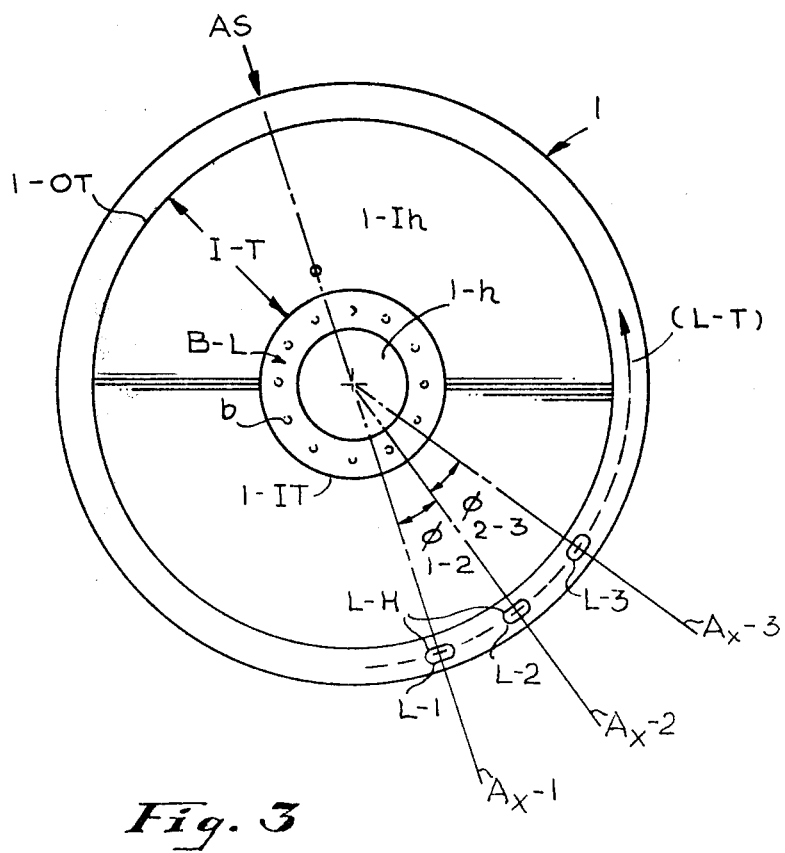
Fig. 3

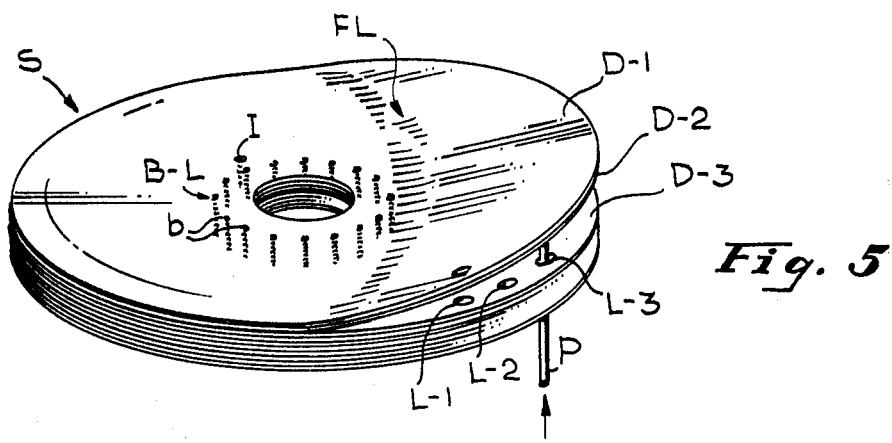
Fig. 5
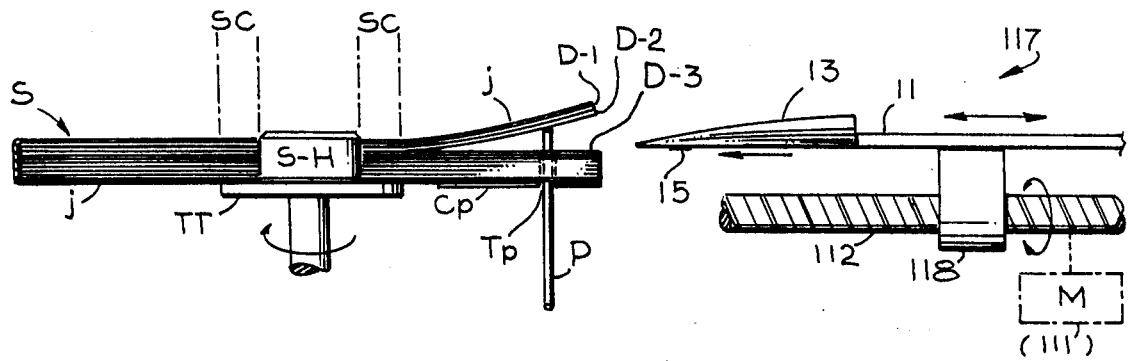
Fig. 6
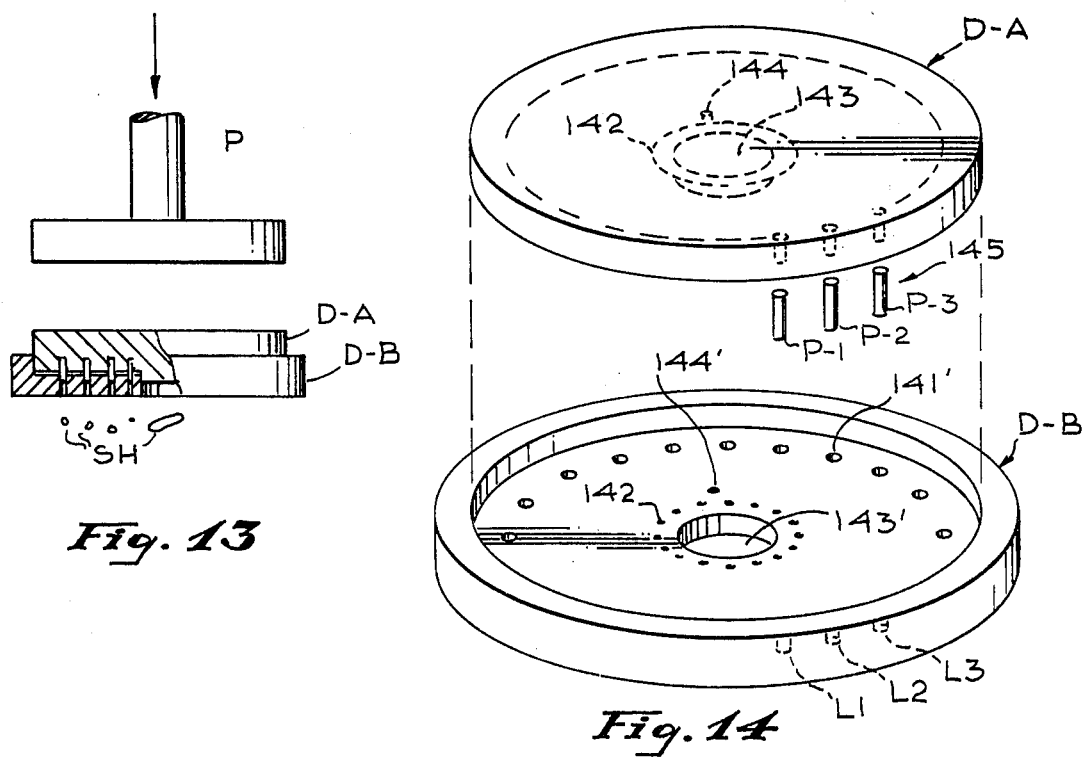
Fig. 13
Fig. 14

JACKET FOR FLOPPY PACK

CROSS REFERENCE TO RELATED APPLICATIONS

This is a continuation of Ser. No. 001,978, filed Jan. 8,1979, now abandoned, which is, in turn a continuation in part of, commonly-assigned U.S. Pat. application Ser. No. 711,579, for "Multiple Disk Pack Cartridge", filed Aug. 4, 1976 now U.S. Pat. No. 4,134,144 this case being incorporated herein by reference.

BACKGROUND AND FEATURES OF THE INVENTION

This invention relates to data recording and in particular to a novel improved jacket for a multiple recording disk array, and associated methods.

Workers in the art of generating and/or utilizing magnetic recording media are aware that it can take various forms. One form, currently enjoying considerable favor, is the "flexible disk", which can serve as a "unit record" for data processing, is compact, light, and is readily transported, stored, and handled, interchangably with other such disks. As workers know the flexible, or "floppy", magnetic disk can be fashioned from the same polyester sheet material as magnetic tape (e.g., the familiar polyethylene terephthalate), with a magnetic coating thereon—this plastic being simply cut into the shape of a circular disk with a central mounting hole to accommodate the familiar rotary-drive spindle. Such a "prior art" floppy disk is well known to workers and is shown in FIG. 1.

Such magnetic memory disks are typically packaged as a cartridge with a container envelope to protect the disk from accumulation of dust and various contaminants and from damaging contact with foreign bodies. This envelope, or jacket, normally includes a central aperture giving access to the disk's center hole for engagement with rotary drive means such as normally included in known disk file equipment. Other apertures are provided in such a jacket to allow access for the magnetic transducer assembly whereby the disk's various data tracks are read and written on. A related known type of cartridge with such a memory disk is disclosed in U.S. Pat. Nos. 3,668,658, 3,815,150 and 3,678,481. A related jacket construction is shown in U.S. Pat. No. 3,864,755, another in FIG. 2 hereof.

The present invention is directed toward improving the design of such cartridges and adapting their jacket for packaging and containment of multi-disk packs (e.g., of "floppy disk packs") and for associated manipulation thereof with automatic disk file equipment. These cartridges are, according to this invention, preferably adapted to facilitate insertion into such equipment, as well as to accommodate the automatic opening and spreading of the jacket, and the selective rotation of the pack therein, along with the automatic partitioning of the pack (to expose any selected disk surface for transducer access and recording operations) —these functions preferably being facilitated with minimal modification of conventional equipment, as described hereinafter.

Workers will recognize that it is novel to provide such a multi-disk cartridge and that it is particularly new to provide such protective jackets which are so adapted for use with automatic disk file equipment. Workers will recognize that prior art jacket means are not adequate to provide for proper containment and manipulation (—especially the partitioning—) of a flexible disk pack; in particular, they have not contemplated any associated jacket spreading arrangements or any jacket structures accommodating such. Nor have workers contemplated jackets for more than one floppy disk, or jackets which are relatively self-sealing (e.g., vs. intrusion of dirt), and which, accordingly must also accommodate "spreading" means or the like to open the way for head insertion, etc.

More particularly, workers have not heretofore contemplated a relatively simple multi-disk jacket like that of the invention—one that is adapted for use with relatively conventional disk file equipment, and that will, nonetheless, accommodate a hole-encoded disk pack and associated manipulations, such as pack-partitioning and disk selection by automatic equipment.

Workers will recognize the unique advantages and surprising results achieved with "floppy disk pack" jackets provided according to the invention. For instance, they will acknowledge that floppy disks are relatively vulnerable, especially when transcribed, transported and handled as a computer "unit record" and stand in need of the protection such jackets afford.

But flexible disks are usually not as reliable or as durable as workers would like. The thin, compliant plastic disk is relatively fragile and rather vulnerable to many common physical hazards, such as sliding contact or impact with a sharp edge, like a head-carriage, a "separator knife" or acccess arm on disk handling equipment. While the cost of the disk and cartridge is relatively inconsequential, the data stored thereon is often invaluable, and if defaced and destroyed by such contact could seriously impair a data processing system. The present invention is designed to alleviate or eliminate such destructive contact while facilitating access to, and manipulation of, a stack of such disks.

Such flexible disk packs are here contemplated as "partitioned" normal to the disk surfaces (i.e., "endwise") in various ways—e.g., by mechanical probes (such as shown in FIGS. 5, 6), or by air jets sent through certain selected bores in the disks and/or intervening spacers, or by other pneumatic impulses conducted through a center-shaft disposed centrally of the pack. The disks are described as embodying magnetic record information (e.g., for computers, entertainment, music, etc.) although they may, in certain cases, contain other information (e.g., analog recordings), and need not be magnetic. In any case, the subject jacket means will be seen as providing "dynamic containment" for such a disk pack, accommodating pack-rotation and such "endwise partitioning" and other, related disk manipulation, such as head-insertion, whether or not the disks and jacket are partition-apertured.

Moreover, in one embodiment, such jacket means will be seen as compatible with relatively conventional disks and cartridges (e.g., for single floppy or for pack which is "side-wise partitionable")—being made to accommodate automatic identifying means (e.g., provided with identity aperture means as in FIGS. 7, 8, adapted to cooperate with associated recognition means (e.g., see FIG. 10 description) whereby equipment handling the subject multi-disk cartridges may also be adapted to handle conventional cartridges. Also, the subject improved jacket means will be adapted to be fixedly positioned in an associated drive unit to be held so, nonrotatingly, while the disks are manipulated.

With the increased popularity of "floppy disk" media, it becomes especially important to provide cartridges which are readily manipulated and transported as "unit records", which are "interchangeable" and which are compatible with relatively simple conventional disk handling equipment. Such "unit record handling" is of high advantage in todays data processing and has led to widespread use of the "floppy disk". Such removable media affords such advantages as the ability to exchange data-set libraries readily available data-set backup for security, and a versatility allowing interchange of data records between various disk file equipment. A lightweight, compact "floppy disk pack" provides a computer record which may be conveniently mailed between stations using ordinary delivery services (e.g., postal services) yet one which is preferably self-sealing against dirt intrusion.

The present invention is directed toward providing improved jacket means for flexible disk records adapted to meet the foregoing problems and objectives, while yet maintaining the convenience of a removable floppy disk pack as a convenient unit record file.

The present invention overcomes the foregoing and other disadvantages of prior art structures and methods and provides the mentioned and other features and advantages according to a novel design.

The foregoing and other features, objects and advantages according to the present invention will be more fully appreciated and become more apparent under consideration of the following description of preferred embodiments, taken in conjunction with the attached drawings, wherein like reference numerals denote like elements.

BRIEF DESCRIPTION OF THE DRAWINGS

FIGS. 1 and 2 are schematic plan views of a prior art flexible disk and an associated prior art jacket, respectively;

FIG. 3 is a diagrammatic plan view of a flexible disk modified with a hole-encoding pattern according to the invention, while

FIG. 5 is a schematic side perspective of the disk pack embodiment of FIG. 4 inter-acting with associated pack-partitioning means; while FIG. 6 indicates a side view of such an arrangement in operative relation combination with a turntable and an associated transducer carriage assembly.

FIG. 7 is a plan view of an improved protective jacket, especially adapted for disk packs like those in FIGS. 4 and 5, while

FIG. 9 is a front perspective view of a "disk drive" adapted for handling disk pack media like the embodiment of FIGS. 4 and 5, as housed in a protective jacket like that in FIGS. 7 and 8, while

FIG. 11 is a schematic side view of a pack partitioning arrangement adapted for use with disk packs like those in FIGS. 4, 5 and particularly adapted for inclusion in a flexible disk drive like that of FIGS. 9 and 10; while FIG. 14 is a schematic perspective view of a pair of mating disk-forming dies adapted to form hole-encoded disks of the type indicated in FIG. 3, these dies being shown in schematic operative relation in the side view of FIG. 13.

DETAILED DESCRIPTION OF PREFERRED EMBODIMENTS—FLEXIBLE DISKS, IN GENERAL

Figure 3A:
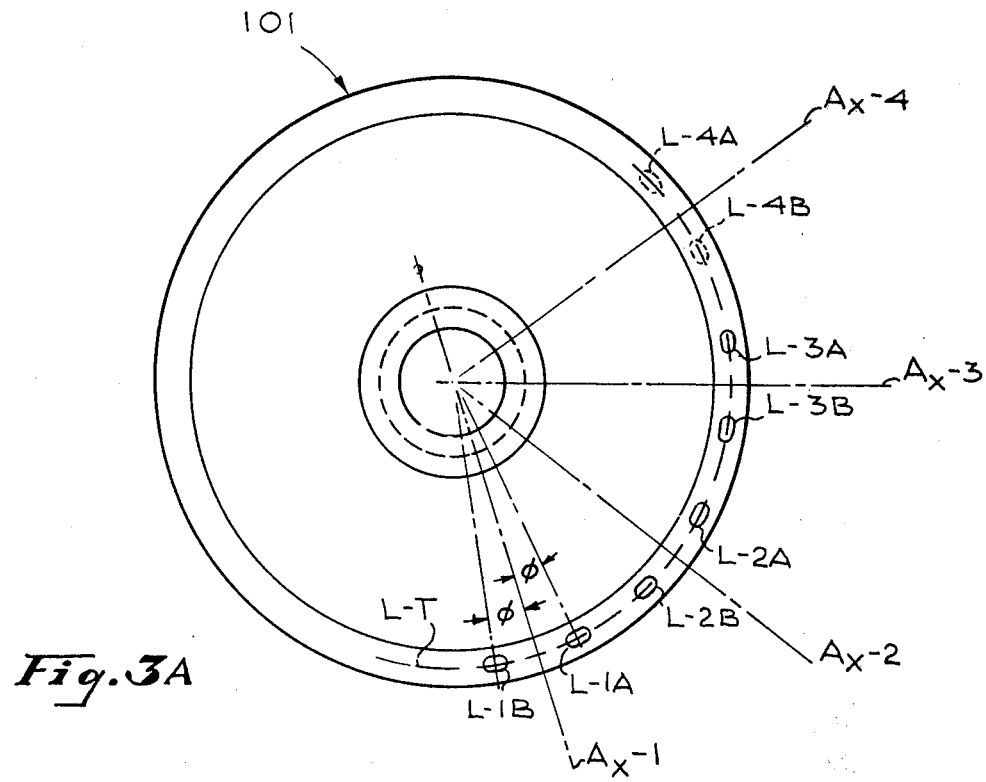
FIGS. 3A, 3B, 3C and 3D are like views of alternate arrays of holes (apertures)
Figure 3B:
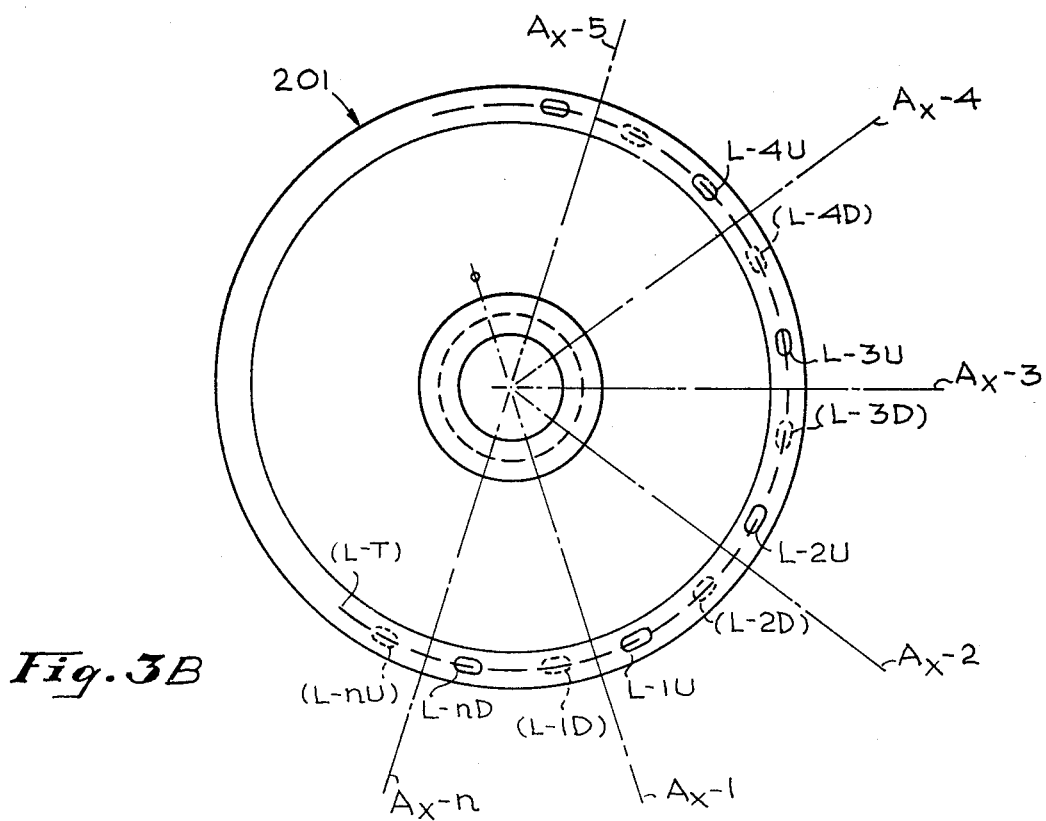
Figure 3C:
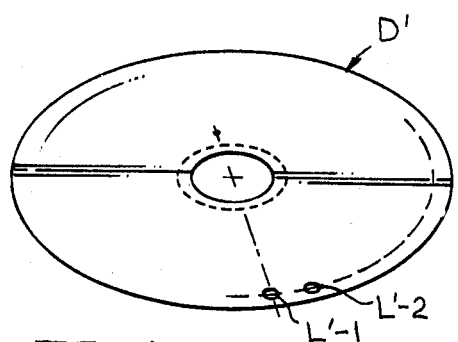
Figure 3D:
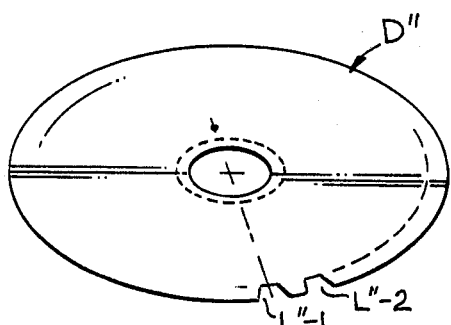
Figure 4:
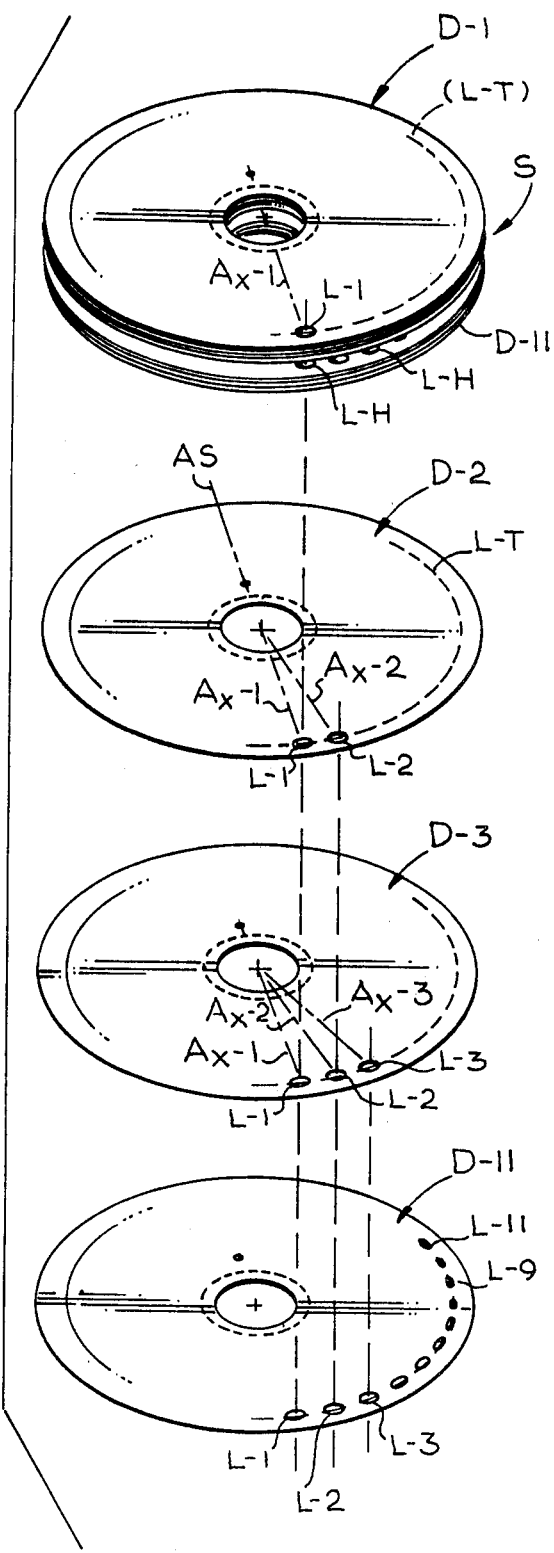
FIG. 4 is a schematic diagram of a flexible disk pack embodiment according to the invention, with exemplary disks therein shown exploded-away for illustrative purposes.

FIG. 3 schematically illustrates a preferred embodiment 1 of a flexible (pliant or "floppy" type) disk record adapted, according to the invention, to be stacked with other like record disks, into a pack as indicated at disk file or stack S in FIGS. 4 and 5. These disks are, as a group and according to the invention, encoded and arranged to be manipulated as a group for the selectable partitioning, or splitting, of the stack adjacent any selected disk surface. This is basically accomplished in accordance with the invention by providing the stacked disks with an encoded arrangement of apertures such that a plurality of unique unobstructed paths are provided from at least one end of the stack respectively terminating at the surfaces of successive disks. A thrusting force applied along a selected one of these unobstructed paths will then cause the stack to be flexed open between a corresponding pair of adjacent disks in the stack. In the preferred embodiments considered herein, this is controlled according to the circumferential position assumed by the pack relative to an associated disk engaging means as described hereinafter.

It is instructive to first consider the design and construction of a relatively conventional floppy disk design 1' as indicated in the prior art FIG. 1. Thus, prior art disk 1' may be understood as a well known "industry-compatible" type of flexible disk particularly adapted for employment as a unit magnetic data record. Such a disk record will be recognized as comprising a circular flexible substrate of polyethylene terephthalate or the like having a magnetic coating on at least one side to thus define a magnetic recording surface. Such disks 1' are adapted for protective containment and operation within an envelope, or jacket 3' as indicated by prior art jacket 3' in FIG. 2 within which such a floppy disk may be stored, as well as rotated for magnetic data-transcription when inserted into appropriate apparatus.

Thus, disk 1' has a central aperture 1'-h for engaging a conventional rotary-drive spindle (while contained within jacket 3'), there being a prescribed recording track zone 1'-T defined between respective inner and outer track margins 1'-IT, 1'-OT; also, an "index hole" 1'-Ih is disposed (within 1'-IT) along a prescribed "reference radius" AS and adapted to establish a "Start Radius" for the circumferential data tracks as known in the art. Within inner non-recording margin 1'-IT is an inner "contact annulus" defining the locus of engagement with spindle-contact means as known in the art.

LOCATOR-HOLE ARRAY

According to a first feature of novelty, a file of novel flexible disks D-1, D-2, D-3, etc., generally like disk 1, are manufactured as a group and adapted to include a prescribed array of separating apertures, or locator holes, L-H, as schematically indicated, for example, by locator holes L-1, L-2, L-3, etc., in FIGS. 3 and 4. This aperture array will be seen as establishing a certain mode whereby the stacked disks may be partitioned according to a unique, simple control involving merely rotating the stack to different (rotational) angular positions, each position corresponding to exposure of a respective one of the disks. Each disk in a file, or stack, S will be understood as having a unique identifiable number of such locator holes L-H so that when the disks are superposed with their index holes 1-Ih and their circumferential edges in registry, they will be seen to represent a hole-encoded array. That is, when viewed from one side, the stack will present an array of locator holes L-H in registry at different circumferential angular locations about the disk periphery that terminate at successive disks. Thus, each locator hole corresponds to a prescribed select-plunger site adapted to facilitate the splitting, (i.e., partial-partitioning), of the stack to expose the recording surface of a corresponding selected disk.

Accordingly, locator holes L-1 pass through all disks and correspond to the "selection" (exposure of upper surface) of the top disk D-1, holes L-2 correspond to exposure of D-2, terminating at disk D-1 so that insertion of a plunger therethrough splits pack S to expose the upper recording surface of disk D-2—or the lower surface of D-1; while holes L-3 expose D-3; holes L-11 expose disk D-11, and so on. This hole pattern is unique for each disk, the holes adding cumulatively in one direction along the pack axis.

Preferably, locator holes L-H are arranged along a circumferential track or locator locus L-T and spaced a prescribed constant radial distance from the disk center and separated by a prescribed constant circumferential distance, or angular separation (that is, angular displacement $\phi_{1-2}$ is the same as $\phi_{2-3}$, etc. in FIG. 3). These encoded locator holes are thus each centered on a prescribed associated radial axis, e.g., axis $A_X$-1 for hole L-1, $A_X$-2 for hole L-2, etc., the holes being of prescribed identical size and configuration—one configuration being elliptical holes (or notches, as discussed below). Thus, as better illustrated in associated FIG. 4, for instance, when eleven (11) such flexible disks 1 are superposed in registry, a stack S results, including disks D-1, D-2 through D-11 disposed for co-rotation by a common spindle (not shown here, but well known, and schematically indicated in FIG. 6 and described below). The pattern of locator holes will be such as to provide the mentioned hole-encoding and enable a prescribed mode of partition.

Thus, for instance, the topmost disk D-1 in the stack is arranged to have a single hole L-1, while the second disk D-2 is arranged to have one additional locator hole L-2 (besides L-1) disposed along an initial axis $A_X$-2; the third disk D-3 in the stack in turn arranged to have identical locator holes L-1, L-2 (as disk D-2) together with one added locator hole L-3, (distinguishing it from D-2, D-1 and all other disks in stack S) aligned along axis $A_X$-3 and along circumferential axis L-T, $A_X$-3 being angularly displaced from $A_X$-2 by a prescribed constant angle. The fourth disk D-4 (not shown) is accordingly likewise cumulatively encoded with locator holes L-1, L-2 and L-3 in registry with these holes on D-3, together with an added hole L-4 along axis $A_X$-4 uniquely identifying this disk and spaced along track L-T and angularly displaced from axis $A_X$-3 by the same prescribed amount $\phi_{1-2}=\phi_{2-3}$ (for example 18°). Eleventh disk D-11 is similarly encoded according to the same pattern, its locator holes L-1 through L-10 being a duplicate of these of adjacent disk D-10 with hole L-11 being added as indicated, (and likewise for other disks in the pack). Such a select hole-encoding will generate a coordinated stack of flexible disks which is arranged so that insertion of a separating plunger at a prescribed angular orientation (e.g., along track L-T, at a selected angular increment from the "Start Radius" AS) can deflect an appropriate sub-group of disks aside to create the desired stack partition for transducer access and engagement with the selected, corresponding disk surface, as illustrated in FIGS. 5 and 6.

This operation will be better understood by consideration of FIGS. 5 and 6 where stack S is shown engaged upon a turntable TT with the disk hubs suitably engaged (e.g., pressed thereon by spindle clamp SC) against rotatable spindle hub S-H as known in the art. A plunger, or disk-select means P will be disposed nearby, being located generally along the "cylindrical locus" including locator track L-T such as to be selectively insertable up through track L-T a prescribed excursion— —and thereby split pack S for "transducer access" by transducer assembly 117 (FIG. 6). Assembly 117 comprises a carriage including arm 11 carrying transducer head 15 and threadedly engaged at barrel 118, for lateral translation (into pack S as is well known—see arrow) by rotation of lead screw 112. Motor 111 is coupled to rotate screw 112 and controlled in a known manner to effect this pack-insertion at prescribed times. Thus, transducer 15 is generally thrust toward, or away, from pack S as indicated and known in the art so that any given (upper) disk surface may be accessed and operated upon.

Thus, in the illustrated arrangement of FIGS. 5 and 6, the upper surface of disk D-3 will be understood as "selected" for access by transducer 15 with overlying disks D-1 and D-2 being thrust upwards and away by plunger P as shown. Accordingly, (and understanding the hole-encoding to be as indicated in FIGS. 3 and 4 above) for selection of D-3, pack S will be angularly rotated with respect to the "thrust-path" $T_P$ of plunger P to bring P into registry with selected locator hole L-3. Now, when plunger P is actuated to be thrust upward, it will pass through holes L-3 which are provided in all disks D in the stack S except for disks D-2 and D-1 (which have no L-3 holes)—and this will thrust D-2 and D-1 upwards (as indicated in FIGS. 5 and 6) to a prescribed partially-partitioned condition. This will allow entry of access arm 11, and particularly of shroud 13 on the distal end thereof. As further discussed below, plunger P is later retracted with shroud 13 then providing supporting engagement with (the lower surface of) disk D-2 during stack rotation. In this way, disks D-1, D-2 may be held deflected-away while pack S is rotated and head 15 is engaged on D-3 for a transducing operation.

According to a further feature, shroud 13 is arranged to smoothly engage such a deflected disk—bending all deflected disks over head 15 as the pack is rotated (within its jacket); also allowing the assembly 117 to be thrust a greater or lesser extent into the stack for translating transducer 15 between various recording tracks on a selected disk.

Similarly, if disk D-2 is next "selected" for transducer operations, transducer mount 117 will be withdrawn, and the rotation of stack S interrupted, with the stack being oriented (as discussed below) to align locator hole L-2 (associated with selection of D2) above plunger P so that upward thrust of the plunger the same prescribed distance as before will pass it through the registering locator holes L-2 in all disks except uppermost disk D-1—which has no L-2 hole and accordingly will be thrust into the approximate location of disk D-2 in FIG. 6. This will then allow the re-introduction of the access arm 11, i.e., of shroud 13 which will then be engaged with the under-side of D-1, so that, with the subsequent retraction of plunger P, stack S may again be rotated to initiate transducer operations upon this selected recording surface (upper face of disk D-2). FIG. 5 indicates, in schematic perspective view, the same upward thrusting of disks D-1 and D-2 and splitting of stack S as indicated in the side sectional view of FIG. 6, with the disks flexing and bending along a prescribed portion thereof (FL) under the upward thrust of the plunger.

PARTITION METHOD

It will be evident that such a partitioning mode involves the simple rotation of the pack relative to the plunger, i.e., to an angular orientation which registers a corresponding pack select-site therewith. Workers will perceive various ways of effecting this. Preferably in this embodiment, for each partition cycle (i.e., associated with exposure of each disk), the pack is brought to the reference orientation [i.e., rotating to align "Start Radius" with the plunger path] and then advanced by the number of successive select-sites required to register the proper site (i.e., corresponding to the particular disk "selected") with the plunger path—preferably doing so digitally.

Table I below summarizes preferred exemplary dimensions and characteristics of this floppy disk embodiment and associated disk pack mentioned above:

TABLE I

| | (FIGS. 1–6) |
|---|---|
| Disk material: | 3 mil (nominal) polyethylene terephthalate with burnished magnetic oxide coating (randomly oriented $Fe_3O_2$) on both sides. Max. coeff. of expansion: Thermal: $9 \times 10^{-6}$ in./in./°F. Hygroscopic: $11 \times 10^{-6}$ in./in./% RH; |
| Disk diameter: | 7.88"; recording between 4.06" (track no. "7b") and 7.23" (track no. "00") radii; index aperture (1-Ih): 0.100" in diam.; at 1.7-2 inches radially out from disk center. "IBM compatible" format [see AN std. document no. 388/75-23 for a flexible cartridge apt for operation at 50-125° F. temperature and 8-80% relative humidity]. |
| Locator holes (L-H): | spaced on 18° centers, along L-H locus at 7.5-7.6" diameter and about 0.156" in diameter (for 93 mil plunger rod), with hole spread of about 3.6°. |

RECORDING CHARACTERISTICS

With a conventional (ferrite-core) magnetic Read/-Write head lightly loaded against the recording zone of a selected subject disk, mounted atop an opposing contact pad, provided conventionally (e.g., as on the Burroughs No. 2027-1441 Flexible Disk Drive, for example), the recording and other characteristics will be generally as known in the art except where otherwise stated.

The described flexible disks may be expected to exhibit very satisfactory resistance to wear and abrasion as understood in the art (e.g., after about one-million wear revolutions on any one track signal amplitude of an "all double-frequency recording" should have no bits exhibiting less than about 75% of the initially recorded signal amplitude). The subject disks are best adapted for "soft sector" format recording (as opposed to the "hard sector", or perforation-designated format, known in the art), the index pulses being generated and sensed without resort to more than a single index aperture.

Now, as those skilled in the art will appreciate, improved flexible recording disks of the type described will lend themselves to many forms of data recording and especially magnetic recording or optical (e.g., video) recording. For instance, with the familiar array of concentric magnetic recording tracks, it may be desired to employ a clocking means such as a separately-recorded clock track with its own separate transducer, or alternatively a separate clock track disk can be incorporated into each pack as known in the art. On the other hand, known techniques may be used which require no separate timing track, for example, inserting a "parity bit" at predetermined locations along each data track or using a recording mode which is "self-clocking".

Various alternate configurations and materials will occur to those skilled in the art, such as the use of chromium oxide or like magnetic coating or the use of acetate or like flexible substrate material, or the arrangement of locator holes in different patterns and/or shapes as discussed below.

ALTERNATE LOCATOR-APERTURE CONFIGURATIONS

The locator holes L-H need not be elliptical but may instead be circular as indicated in FIG. 3-C, (rather then being elongated along the locator axis L-T sufficient to accommodate contemplated variations in locator-rod positioning relative to the disk stack, as is indicated in FIG. 3). Disk D' in FIG. 3-C is generally the same as the disk 1 in FIG. 3, except that the locator holes L-1, L-2, etc. in FIG. 3 are extended in their elongate direction along axis L-T to be roughly twice as long, with rounded edges, (preferred: about 0.16×0.3 inches) where they are circular in FIG. 3C.

As a further alternative, the locator apertures may comprise "notches" rather than "holes" as indicated in FIG. 3-D for alternate disk embodiment D". Disk D" is generally the same as disk 1 in FIG. 3 except that the locator holes here comprise a pair of rather semi-elliptical edge notches L"-1 and L"-2. Workers in the art will conceive other like modifications, for instance, where the entire periphery of the disk is "cut-out" between all locator holes—such as by cutting out the "lands" between L"-1 and L"-2 in FIG. 3-D. Alternatively, the disk periphery may be cut-back within the hole peripheries except for "sector-lands" extending radially from the disk, forming extended circumferential "tabs" adapted to engage select-rods—being disposed entirely about the disk except where the locator holes would have existed (and between such locator sites as well). Of course, the size and configuration of a locator aperture wil generally correspond to that required to accommodate a given partitioning-plunger (shape, diameter) configuration and consistent with the positioning accuracy of the associated "select-partitioning" system. Such a "tab-select" arrangement will be better adapted for relatively rigid disks.

MULTIPLE "PARTITION-PLUNGERS"; "PAIRED" LOCATOR HOLES

Further, according to a modified feature of the invention, indicated functionally in FIG. 3A, a plurality of such "partition-plunger means" (rather than a single plunger) may be used, together with associated plural sets of accommodating locator-holes. Thus, a modified embodiment 101 (identical to disk 1 in FIG. 3 except as otherwise described) will be seen as including "locator-sectors" characterized by a pair of locator holes A and B symmetrically flanking each "locator axis" equidistant therefrom. With such a modified "double-hole" locator pattern, disk 101 will thus be understood as intended for use with a pair of partitioning plunger rods, each similar to that described in connection with FIGS. 5, 6 and 11, except that two rods (rather than one) are used to deflect the pack (—such a pair being more fully described below in connection with FIG. 12).

Thus, for instance, rather than a single select hole (e.g., L-1, FIG. 3) being centered in a "first locator sector" along the "first selector radius", $A_X$-1, the so-modified flexible disk embodiment 101 (FIG. 3A) substitutes a pair of such holes (L-1A, L-1B), each displaced from this axis $A_X$-1, on opposite sides along locator track L-T, by the same angle $\phi$ (i.e., symmetrically flanking their associated selector radius). Similarly, the second locator sector and its radius $A_X$-2 serve to reference two "select apertures" (rather than one), namely L-2A, L-2B; likewise for the "third" select radius $A_X$-3 about which a pair of associated select apertures L-3A, L-3B are symmetrically flanked.

Thus, for example (and as more fully described below), when the flexible disk (D-4) next to disk 101 (assumed to be D-3), in an associated stack is to be "selected" for Read/Write operations, the stack will be partitioned by the pair of locator rods—the rods being moved into registry with associated locator holes L-4A, L-4B (shown in phantom here) flanking the "fourth" select radius $A_X$-4. Then, when on rod is thrust upward in the "standard" manner, disk 101 (i.e., D-3) along with the first and second in the stack (i.e., D-1, D-2) will be lifted upwardly to expose the upper recording surface of D-4.

UP/DOWN SELECTION MODE, WITH OPPOSED PLUNGER PAIRS AND "STRIPPING" OF SELECTED DISK

FIG. 3B indicates how a pair of associated select plunger means are adapted to be "opposingly partitioned", i.e., be driven in opposite directions, so that, to the upward partitioning-thrust there is added a second contemporaneous downward, partitioning-thrust in each partition operation. As workers can see, this added down-thrust can "strip" the "selected" disk from the upwardly-thrust stack portion—more positively and more quickly—and prevent it from being accidentally carried-up with it (e.g., adhering via suction or static electricity, etc.). Further, such a "paired-sites/alternate hole" array of locator holes is provided to accommodate this "opposed partitioning" mode. Modified disk embodiment 201 in FIG. 3B illustrates this schematically (being identical to embodiment 101 in FIG. 3A, except that only one "companion hole" in each pair is cut through—to thereby accommodate opposing (up-down) plunger action on a sector during "selection". Thus, there are still a pair of select-hole "sites" in each sector). The site pairs flank their associated select-radius $A_X$ in equidistant symmetry; however, with only one hole in each such pair actually cut through at any sector—i.e., with "up-holes" cut where sector-selection involves selection of the given disk or a superposed one, and with "down-holes" through all other sectors. This hole-pattern will be seen as accommodating the "opposed-partitioning" mode described.

Thus, for instance, disk 201 may be viewed as constituting the fourth disk (from the top) in a stack (much in the manner of embodiment 101 in FIG. 3A), with each of its select radii $A_X$ flanked symmetrically by a pair of such (up/down) "select sites", (e.g., an upward-select site at L-1U, with a hole cut there; and a downward-select "site" L-1D, with no "hole" cut there—both these hole-sites being found in the "first sector", symmetrically flanking the "first" select axis $A_X$-1).

This "paired site/single hole" pattern of locator-holes will be understood as functioning to provide each disk in a given stack with one, and only one, select hole cut in each and every one of its "select sectors". Thus, for any given disk in a given stack, there will be one such locator hole (but only one) cut in each sector—with "up" holes cut in the disks own "select sector" (e.g., sector "four" at $A_X$-4 for disk D-4) implying up-deflection of superposed disks; and in all the "lower-order" sectors (corresponding to the number of disks "below" the given disk, e.g., D-5 through D-20 "below" selected disk D-4); whereas, conversely, "down" holes are cut in all other disks ("higher order") at this sector. For example, for disk 201, or D-4, in a 20-disk pack, "up-holes" L-1U, L-2U, L-3U and L-4U are cut only for the first four sectors, with "down" holes cut for all other, "higher-order", sectors (i.e., L-5D, L-6D through L-20D). Similarly, the "topmost" disk (D-1) has an "up-hole" cut only at its first sector (adjacent axis $A_X$-1) with all other holes being "down-holes".

Hence, in the selection of the "first" (i.e., top) disk D-1 in a stack, associated with disk 201, the upward thrusting select-plunger will be understood to pass through all disks (through "up holes" L-1U in the first sector of all disks including D-1), while the downward-thrusting plunger will pass through "no disks", but merely thrust D-1 downwardly to pin it. Or, for the selection of the next (i.e., second) disk, D-2, in this stack, the "up plunger" will be registered at L-2U and will pass through all disks except D-1 (through all "up" holes in the second sector of D-2 to D-n), and so deflect D-1 to expose D-2, while the "down plunger" will register at site L-2D and will pass only through disk D-1 to "strip away" D-2, pushing it downward. Or, in the selection of the third disk, D-3, the "up" plunger will pass through disks D-3 to D-20 (L-3U holes therein), while the "down" plunger will pass through disks D-1 and D-2 only (L-3D holes therein)—so on and so forth.

Now, a "paired" array of locator holes as above described (such as in FIG. 3A) need not, in all cases, imply the symmetry of hole location described and illustrated (i.e., symmetrical flanking of given select axis). But such symmetry is preferred. For instance, it affords an extraordinary, unexpected advantage in event of "double side" recording whereby the disk stack may be "flipped" (turned upside-down) and still be partitioned with a plunger pair, without any change in the relative positioning or the operating mode of the plunger arrangement. Workers in the art will perceive this to be a very significant advantage and convenience.

Workers will perceive other advantages accruing from the foregoing novel hole-encoded flexible disk design according to the invention. One such advantage is that it is compatible with the bulk of present day recording disk media, as well as with known equipment for handling such disks—thus being adapted for use, interchangeably, with conventional floppy disks where desired. For instance, the existence and pattern of the peripheral locator hole pattern need not interfere with, or change in any way, the operation or construction of a conventional (single-disk) drive and Read/Write assembly. Also, as indicated, the disk is adapted for mounting on standard (single) flexible disk turntables for transducing rotation and for relatively conventional transducer access and engagement the units being modified to accommodate pack dimensions. Further, such an improved flexible disk pack may be combined with conventional (single-disk) protective jackets, as indicated below and in FIG. 2. Moreover, workers will recognize that a "hole-encoding" scheme such as employed herein for flexible disks may, in certain instances, be adapted for rigid, or semi-rigid disks as well.

NOVEL DISK PACK

According to a principal feature of the invention, improved flexible disks like those described above are apt for collation and stacking together in combination and properly registered in a novel "flexible disk pack", as indicated, for instance, in FIGS. 4 through 6. It will be evident, of course, that the pattern of locator holes (whether single or double pattern) will be coordinated in the usual case with a particular stack in mind, the stack being comprised of certain number of such disks, with each disk in the stack having its own unique variation in the (common) pattern of locator holes e.g., each with a unique number or relative location of holes. Thus, as more fully described below, one may manufacture these disks in sets for efficiency and convenience sake. For instance, to render a pack such as shown in FIG. 4, one may punch-out a set of "first" (i.e., D-1) disks, then a set of "second" (D-2) disks and so forth; the disk packs being each assembled thereafter by collating one each from the D-1, D-2, D-3, etc., sets, up to a prescribed total number (D-n) in the pack. As a feature of convenience the disk total may be left somewhat "open-ended" and variable, so that disks may be added at any time after a pack is first assembled.

Manufacturers will find it particularly convenient to manufacture flexible disks according to the invention by relatively convenient inexpensive means, such as in a cutting-out or stamping operation as detailed below. For instance, for embodiments as in FIG. 4, a die press arrangement of the type known for working with such polymer sheets may be made up to cut the "D-1" disk pattern; then it may be modified very slightly to cut the "D-2" disk pattern, then modified again for the "D-3" disk pattern, etc. (see Ex. 1 below). Alternatively, in the case of the "double set" of locator holes described above, a similar, but modified, convenient mode of disk fabrication may be followed. Or, when a single hole pattern is used, only one such die press, and related stampling operation, is needed.

Preferably, and according to another feature, when such a disk pack is assembled, the disks are bonded to one another at bond sites dispensed along a common registering circumference, adjacent the disk center, and spaced radially therefrom to lie in the inner "non-recording" band. Thus, a circular array of "epoxy pillars" B-L is indicated as the bonding sites in FIGS. 3 and 5, to constitute such a pack bonding means, whereby each pillar B (FIG. 5) is comprised of epoxy. This epoxy is introduced in a viscous liquid form to fill a number of particular registering sets of bores, one bore through each disk constituting a set. Once the stack has been assembled, with the disks positioned so that their corresponding apertures and bores lie in registry, such bond-fillings may be applied together. The viscous epoxy fill, in the usual case, spreads down the bore tunnel and somewhat beyond the periphery of each bore, to lodge between superposed disks and then harden to form a clamping "pillar". This "adhesive pillar" will hold the disks together as assembled in the stack and keep them from lifting away from one another and from being rotated into mis-registration with one another.

Worker will contemplate alternate bonding techniques. For instance, one might interpose an annular spacer between disks in a pack and provide it with adhesive surfaces adapted to adhere to the upper and lower disk thereby bonding them together. In another technique, where contemplated disk format and handling allow, one might insert pins through each set of bonding bores and cap their ends, thus preventing mis-alignment in the radial and circumferential sense (also, perhaps, allowing prescribed axial freedom to better accommodate pack partitioning).

Workers in the art will recognize that such a permanently bonded flexible disk pack is new in the art and is uniquely well adapted for many desirable functions, such as the hole-encoded disk selection operations (described elsewhere), as well as for containment and operation of the pack—as a whole—within a protective jacket (as described below). Thus, workers may now contemplate the use of a multi-disk flexible pack as a multi-surface unit record which is almost as lightweight, as compact and as easy to manipulate, store, transport, etc. as a single disk, while having many times its storage capacity.

By way of illustration, it has been found that a pack of 20 flexible disks according to the invention (e.g., as in FIG. 3 and Table I), each with a nominal 3 mil thickness, can be used in a "floppy disk pack" presenting a composite thickness of little more than 60 mils and, rather surprisingly, may be readily packaged and operated in a protective jacket similar to the prior art jacket indicated in FIG. 2. Further, such a pack may be manipulated and operated inside this jacket with disk drive equipment that requires relatively little modification over the conventional single-disk drives known in the art.

LINERS

Figure 5A:
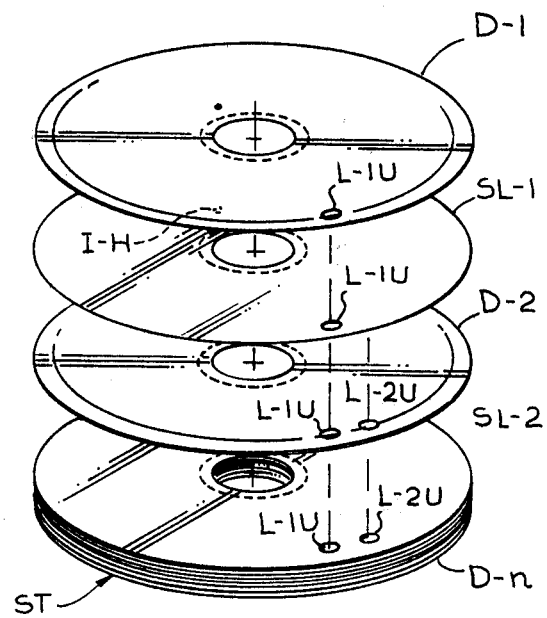
FIG. 5A shows a similar, schematic, view of a like disk pack embodiment, including separator disks as well, with several elements explodedaway for illustration purposes.

FIG. 5A indicates a similar pack of flexible disks, D-1 through D-n, understood as bonded together in fixed, registering superposition to form a single unitary multi-disk pack ST. This pack is, however, somewhat modified, according to a further improvement feature, to include protective flexible spacers, or "liners" (SL) interleaved between adjacent disks in the packs. More particularly, FIG. 5A shows the upper two flexible disks, D-1 and D-2, exploded-away from stack ST for illustrative purposes, and indicates the protective liner means in the form of flexible plastic disks, SL-1 and SL-2, interposed between D-1/D-2 and between D-2/D-3, respectively.

Preferably (and mostly for convenience), liners SL are comprised of the same (or a closely similar) flexible plastic material as the disk substrates, but of course, will preferably carry no magnetic coating. It has been found that confronting oxide-coated sheets in certain embodiments may be rubbed or scraped against one another such as to "scour" or gall magnetic oxide from one to the other. For instance, this may occur with a novel flexible disk pack during partitioning, etc., and can be damaging.

According to this feature, liners S may be provided to protect every oxide surface, preferably being bonded together along with the disks into a unitary pack. Liners SL include an index hole I-h in registry with that of the disks D, as well as a locator hole pattern identical with that of the adjacent disk and in registry therewith. As to the "up-holes" (e.g., L-1U illustrated in SL-1—i.e., adapted for the "up" select/partitioning arrangement represented by the disk embodiment in FIG. 3), it will be understood that a liner's locator hole pattern will be identical to that of its adjacent *superposed* disk (here disk D-2 for liner SL-2, D-1 for SL-1). For embodiments also including "down-holes" (as in the embodiment of FIG. 3B) the down-hole pattern of a liner will follow that of its infraposed disk (so a liner will never intervene between a transducer and exposed disk). Thus, the spacers, or liners SL, may for instance, comprise a clear polyester, such as polyethylene terephthalate (e.g., a white "Melanex", trade name of ICI) about 1-2 mils thick, or a similar thin flexible material with a low friction, "non-galling", anti-wear surface (or surface coating). Liners will be especially useful where contemplated pack life/usage is to be extended and the associated pack enlargement can be tolerated.

Alternate liner materials may of course be used as contemplated by workers in the art, the thickness and other characteristics thereof being modified to suit the requirements of a particular application. While not necessary in every application the use of such liners is preferred in cases where one or both magnetic recording surfaces of a flexible disk, so bonded into a flexible disk pack, exhibit wear and abrasion problems.

Of course, alternative to using liners SL, the stacked disks D may have one side thereof coated with a protective film, shielding it from such adverse contact with a facing magnetic recording surface (e.g., a coating of one to several mils of clear plastic such as "Black Watch" by 3M Co.) or the plastic substrate may be left uncoated by any magnetic oxide or by any similar coating. Of course, as workers in the art know, flexible disk manufacturers prefer to coat both disk sides with a magnetic oxide for their own manufacturing convenience, and to prevent curl.

EXAMPLE 1: MANUFACTURE OF HOLE-ENCODED FLEXIBLE DISKS

Workers in this art will visualize various practical ways in which hole encoded flexible disk records of the type described may be manufactured. One such method is schematically indicated in FIGS. 13 and 14 and involves a die press, or punch, arrangement particularly apt for punching-out all the several apertures of disk embodiments like those described in FIG. 4, etc. above. By way of example and according to an associated feature, it will be seen that such a disk manufacturing arrangement is intended to punch-out a "family" of related flexible disks (like disk embodiment D-1, D-2, D-3, etc., in FIG. 4) adapted for coordinate assembly and operation in a bonded pack like that described, using relatively conventional means and methods.

According to a further feature, this stamping arrangement may also be readily modified, by means well known in the art, to inexpensively and conveniently manufacture all the different successive-numbered disks in a pack—each with its unique modification of the select-hole pattern, using, essentially, a single press with simple die modifications. For instance, one may, according to this feature, manufacture 1,000 identical hole-encoded packs, each comprised of eleven different flexible disks (D-1 through D-11) by first using the arrangement to press out 1,000 identical "first" disks (D-1); then, with a slight modification (described below and using the same process) manufacture 1,000 D-2 disks, then with a further slight modification manufacture 1,000 D-3 disks, etc.—through D-11. Thereafter, 1,000 packs may be collated and bonded from these.

Accordingly, it will be readily understood that if one starts with a circular disk design having the standard outline configuration (i.e., of disk 1 in FIG. 3), this stamping operation will basically function to punch holes of the proper dimension and location for the spindle, for the index hole, for the bonding apertures, and for the selected pattern of locator holes—these last being variable according to the disk number, or hierarchy, in the contemplated pack of FIG. 4. Also, the disk periphery might then be cut also.

Thus, for example, a flexible sheet of polyethylene terephthalate about 3 mils in (nominal) thickness, and having the mentioned circular configuration (e.g., diameter of about 14 inches) may be disposed within a concave, cuplike bottom die member D-B, held in a press fixture to be impressed by a mating press member D-A, adapted to impress the sheet onto D-B and cut out all apertures in one pressing stroke. Thus, press plate D-A is adapted to be superposed atop a plastic disk so located in D-B and be pressed downwardly by suitable pressing means (known in the art and not shown, but indicated schematically in FIG. 13 at press P), to thereby form the indicated pattern of apertures, punching-out the appropriate segments of this plastic sheet (note the shards SH indicating this in FIG. 13). Except as otherwise described hereinafter, this operation will be understood as being conducted as known by workers in the art from work with similar conventional methods.

More particularly, the cuplike die D-B, understood as the "female die", is provided with apertures of the appropriate size and location, namely apertures for: the spindle hole 143', and for the (entire, 11-hole) pattern of locator holes 141', these apertures in die D-B being adapted to receive and mate with corresponding registered protuberances on the related "male" press die D-A, selectively (when such are present), so as to cut out portions of the plastic disk and thus form the mentioned disk apertures.

Thus, die-press D-A is correspondingly formed with projecting plugs, or pressing protuberances members, understood as, each, adapted to interfit "cuttingly" with an associated congruent one of the mentioned apertures in die D-B, being of the same relative cross-sectional size and occupying the same position. Disk D-B thus comprises a spindle plug 143, and index plug 144, an array of bonding points or plugs 142, and a variable array of "selectively removable" locator plugs P.

Locator plugs P are, as schematically indicated in FIG. 14, to be understood as, preferably and according to an improvement feature, selectively insertable into a receiving bore and held there for a given pressing operation—being apt for removal thereafter, at will, to form any desired variation in the locator hole pattern. Thus, for instance, dis-press D-A will be understood in FIG. 14 as illustratively indicating the insertion of three locator plugs 145 (i.e., plugs P-1, P-2, P-3) into receiving bores positioned and dimensioned to make the cuts forming locator holes L-1, L-2 and L-3 respectively in disk 1 in FIG. 3 (along with the other associated holes for indexing spindle and bonding, as before indicated). These plugs may be held in these bores by suitable means (not shown) or may constitute any other like arrangement (known in the art but not illustrated).

Workers in the art can readily visualize that, in any given pressing run, one, or several, circular plastic disks may be so impressed to be formed with the pattern of apertures represented by die-press D-A and that this die-press may thereafter be modified by addition, or removal, of locator plugs 145 to press-out another disk which is identical except for a modified locator hole pattern. For instance, after pressing of a suitable number of D-3 disks with the arrangement of locator plugs 145 indicated in FIG. 14, another locator plug P-4 (not shown) may be added to stamp out "D-4" disks, etc. Of course, the "lower order" disks D-1 and D-2 may be formed by removing P-3 and then also P-2 respectively. Thus, it should be apparent to workers skilled in the art that according to this feature, with this or any similar stamping operation, stacks of hole-encoded disks of the type described may be very inexpensively and conveniently produced.

ASSOCIATED JACKET EMBODIMENT

Figure 7:
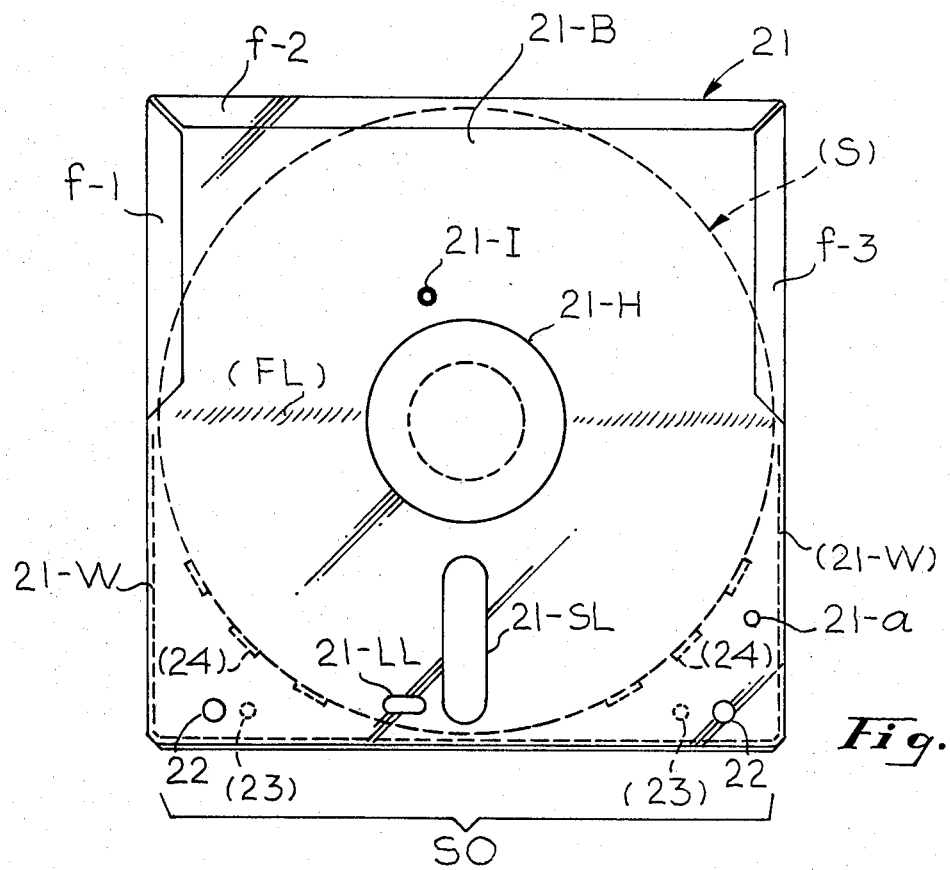
Figure 8:
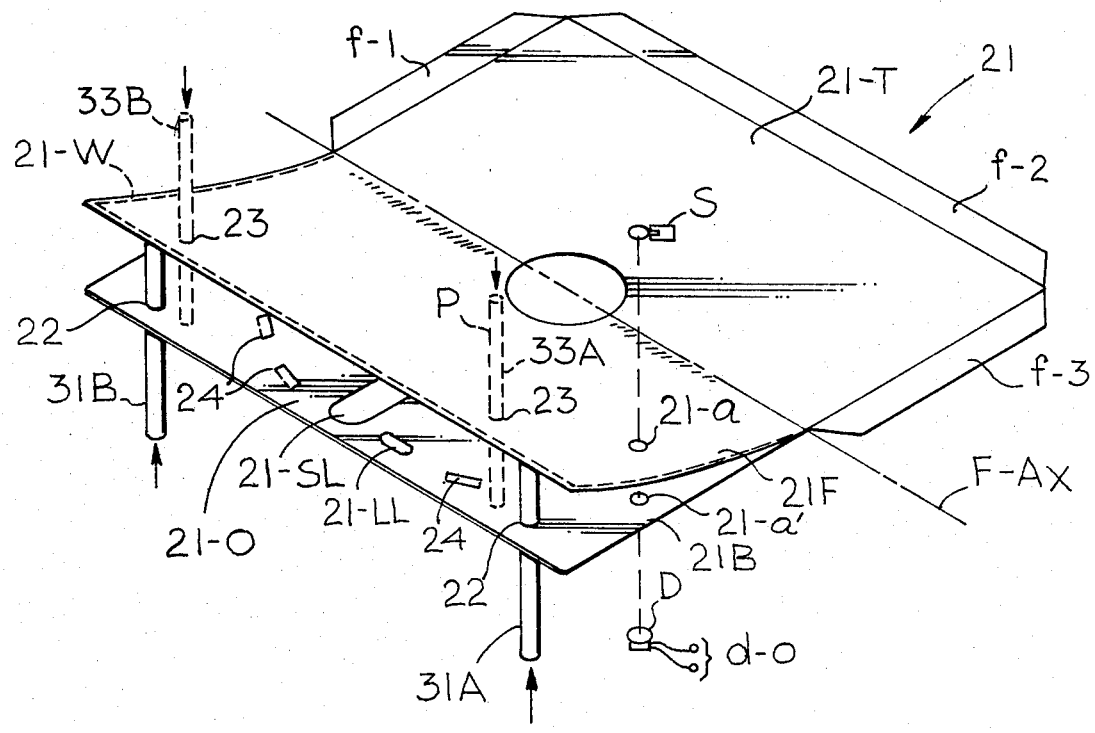
FIG. 8 shows this jacket in inverted perspective view and disposed in illustrative operative relation with schematically indicated opening means and partitioning means.

Novel disk pack embodiments like those above described will be understood by workers to be particularly apt for advantageous use in the form of a cartridge, i.e., the resulting structure obtained when the disk pack is employed in conjunction with a protective jacket structure in which the disk pack remains during partitioning and transducing operations. Such a jacket 21 is indicated, for instance, in FIGS. 7 and 8, being designed somewhat along the lines of a prior art, single-disk jacket 3' (FIG. 2), but modified for the purposes of the present invention as illustrated in FIGS. 7 and 8. Jacket 21 is shown in plan "bottom" view in FIG. 7; and is shown, in "top" perspective view, in FIG. 8 as cooperated with jacket-opening means, schematically shown in conjunction therewith and functioning as described below. Such a modified jacket will be perceived as especially suited for housing a rotatable pack of flexible disks, like pack S in FIG. 5, being apt for accommodating the rotation thereof, in situ, as well as for the locator hole partitioning mode and associated transducer access described above.

Thus, referring to FIGS. 7 and 8, jacket 21 comprises a pair of opposed, relatively flexible panels, namely top panel 21-T and bottom panel 21-B, joined together, along a closed end as well as along about one-half of the two adjacent sides by means of flaps f-1, f-2 and f-3 shown extending in partly assembled fashion from top 21-T in FIG. 8, and shown folded-over and joined to the edges of top panel 21-T in FIG. 7. Panels 21-T, 21-B may be comprised of PVC (polyvinyl chloride of about 10 mils nominal thickness), or like material, known to workers in the art.

Figure 9:
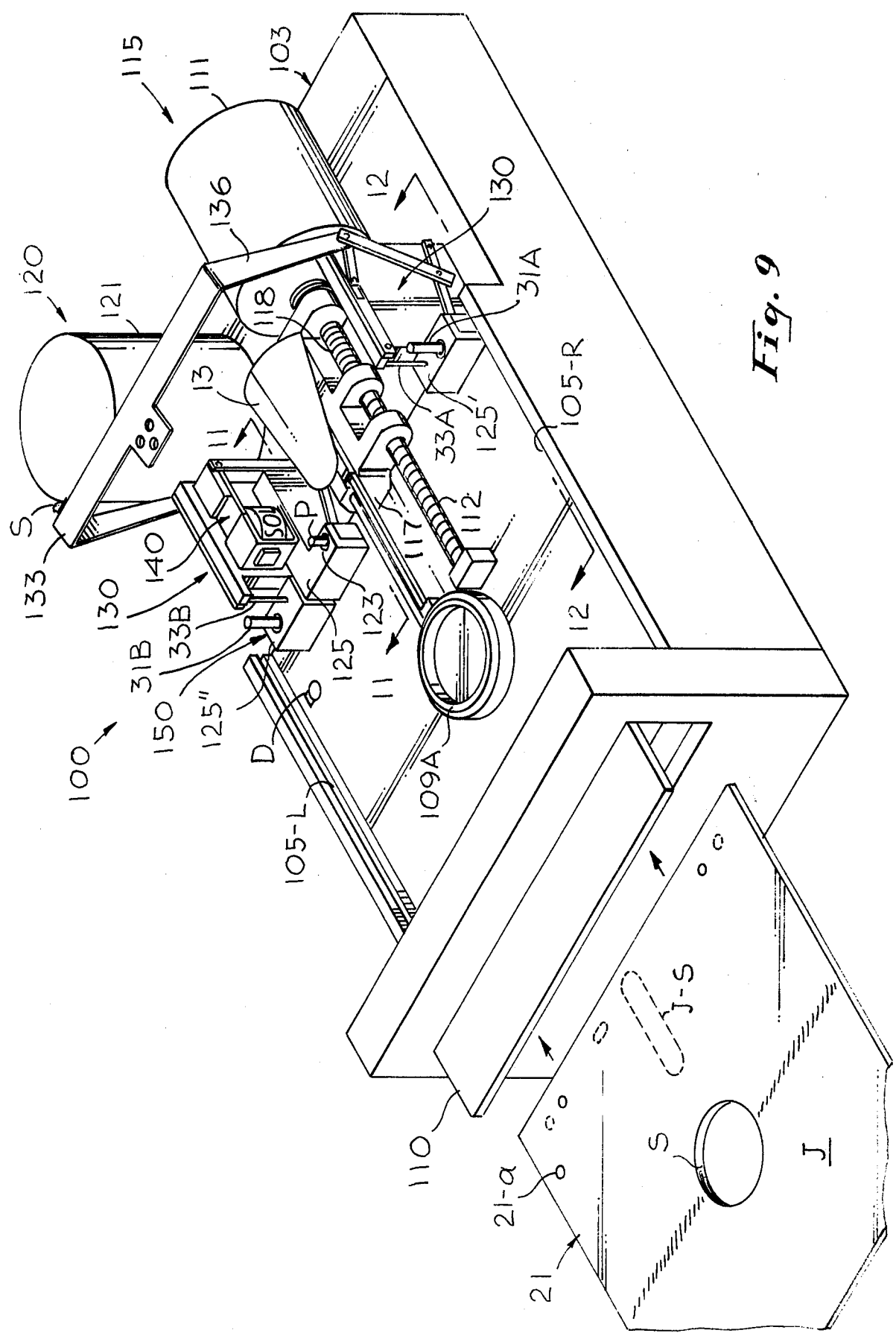

It will thus be understood that these top and bottom jacket panels 21-T and 21-B are preferably joined by folding over flaps f-1, f-2 and f-3 so as to permit their being spaced apart sufficiently to form an entry slot 21-O for admitting and operating a flexible disk pack of prescribed diameter and thickness, such as shown in FIG. 5. Jacket 21 will have conventional apertures corresponding to the spindle hub and index hole (21-H, 21-I, respectively, but slightly enlarged therefrom), as well as having two pairs of "spreading-rod apertures" (up-spreader-apertures 22 through base panel 21-B, and "down-spreader apertures" 23 through top panel 21-T), to accommodate the upper and lower jacket spreading means, according to the invention (see in phantom FIG. 8). Illustrative pack S is shown outlined in phantom in FIG. 7. Spreading is preferably done automatically when the so-formed cartridge (jacket 21 containing disk pack S) is inserted into a disk drive, (FIGS. 9 and 10) this being indicated schematically by the up-thrusting plungers 31 and the downthrusting plungers 33 in FIG. 8, according to another feature. Down-plungers 33 are preferably also arranged to pin the jacket to a fixed portion of the chassis to hold it fixed with respect thereto when the pack is rotated therein. Preferably the "spreading action" of these plungers is automatically invoked by closing of the entry door of the drive apparatus after admission of the pack-containing jacket (FIG. 9). It will thus be apparent that the two opposed (upper and lower) "spreader means" 31 and 33 act in concert to separate the outer edges of the "entry slot" 21-O when the disk pack is to be "accessed" by a transducer assembly (FIG. 6).

Retainer means such as tabs 24 are also preferably provided within jacket 21 to retain the disk pack, removably, in prescribed position therewithin. These retainer tabs 24 preferably comprise a suitable number of upper and lower inwardly-projecting members projecting normally inward from the top and/or bottom panels adjacent entry-slot S-O and "following" the periphery of the pack as positioned within jacket 21. This is indicated schematically in FIGS. 7 and 8.

An "entry-flap" 21-F is formed of the "outer-half" of top panel 21-T, as schematically indicated in FIG. 8. Flap 21-F is normally in "closed position" (e.g., preventing dirt intrusion, while being also adapted to be "spread-open" e.g., preferably by pivoting away from lower panel 21-B, along a prescribed flexing axis F-A$_X$ so as to provide an entry slot 21-O sufficient to accommodate the partitioning of the pack within the jacket as well as the related entry of the transducer assembly, as illustrated in FIG. 6. Preferably, this pivoting flap 21-F is held closed, to retain and protect the contained disk pack by suitable "spring return" means, either in the form of panel material which is suitably stiff and/or with a stiffening "return-wire" 21-W embedded along the periphery of the flap as indicated schematically in FIGS. 7 and 8. In extreme cases, return springs may be provided across slot 21-0. Thus, the jacket is seen as accommodating some sort of spreader means, whether mechanical (e.g., plungers of FIG. 8), pneumatic, etc. (also cf pages 44–45). Also, being "self-sealing", it will preferably require some positive ("spreading") force to open the container cavity (e.g, to admit a Read/Write head).

Jacket 21 also has a slot 21-SL in base panel 21-B to accommodate engagement of the enclosed flexible disk pack (specifically the "bottom" disk thereof) with a transducer "contact pad" (CP) (see FIG. 6) when a Read/Write head is impressed upon (one or several disks in) the pack, opposingly, as known in the art. Similarly, bottom panel 21-B is also provided with an elliptical locator aperture 21-LL adapted for admitting a select-partitioning plunger of the type described above and illustrated in FIG. 5 and elsewhere.

Jacket 21 and the flexible disk pack contained therein thus comprise a novel flexible disk cartridge, with the pack so positioned and held therewithin as to be free to rotate, as well as to be selectively partitioned and accessed therein as previously described. Jacket 21 is preferably lined with a non-shedding, non-abrasive cleansing tissue on its inner faces as known in the art, to wipe clean and protect the outer surfaces of the disk pack contained thereby.

MODIFIED DRIVE FOR FLEXIBLE DISK PACK

Figure 10:
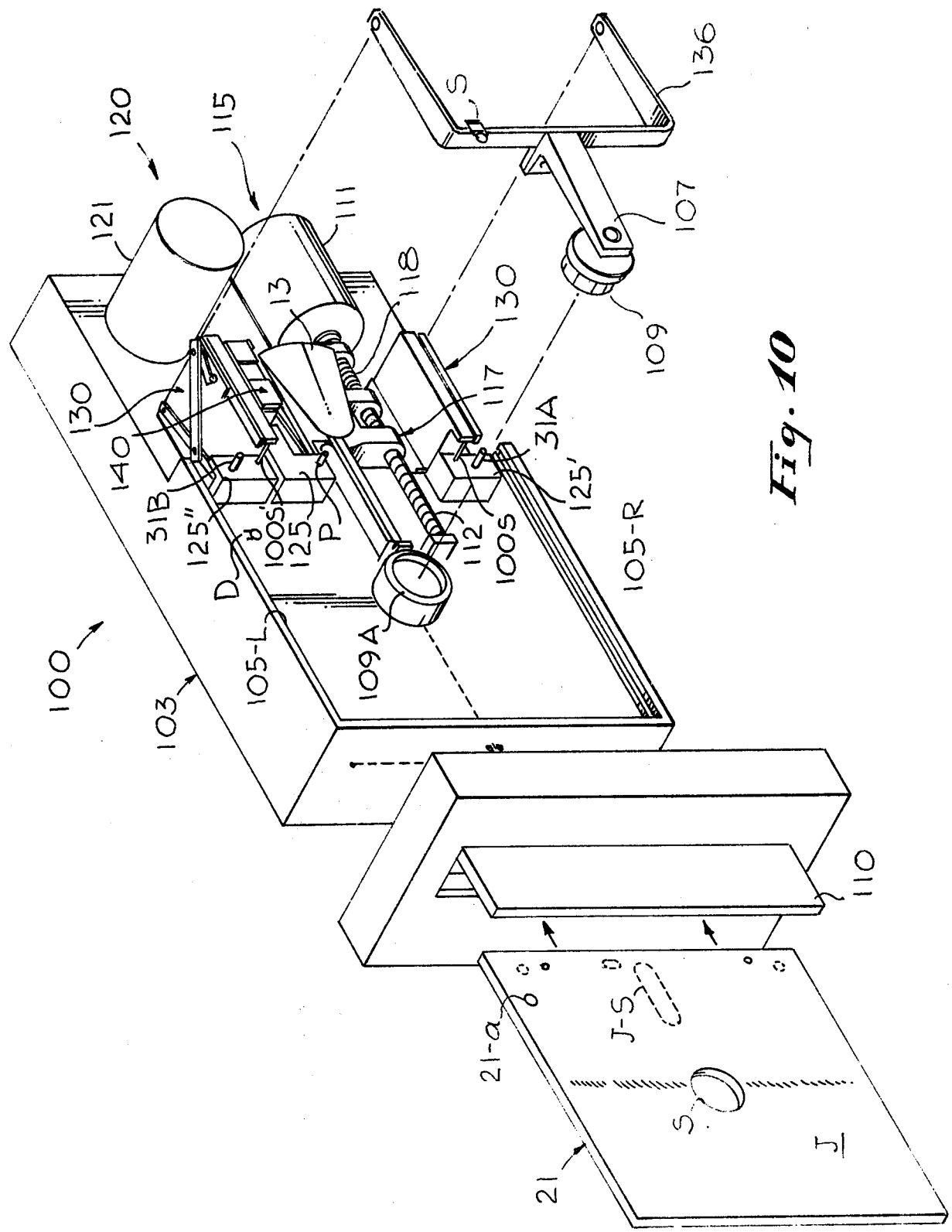
FIG. 10 is an enlarged close-up view of working elements of this drive, with certain superstructure broken-away for clarity of illustration.

FIGS. 9 and 10 show a relatively conventional type of flexible disk drive 100 which has been modified to accommodate operation with novel cartridges (jacketed flexible disk packs) according to the invention. That is, drive unit 100 will be understood by workers in the art to comprise a compact, portable, disk drive device that interfaces with a central processor portion of a data processing system by way of a suitable control unit (not shown), as known in the art.

Figure 11:
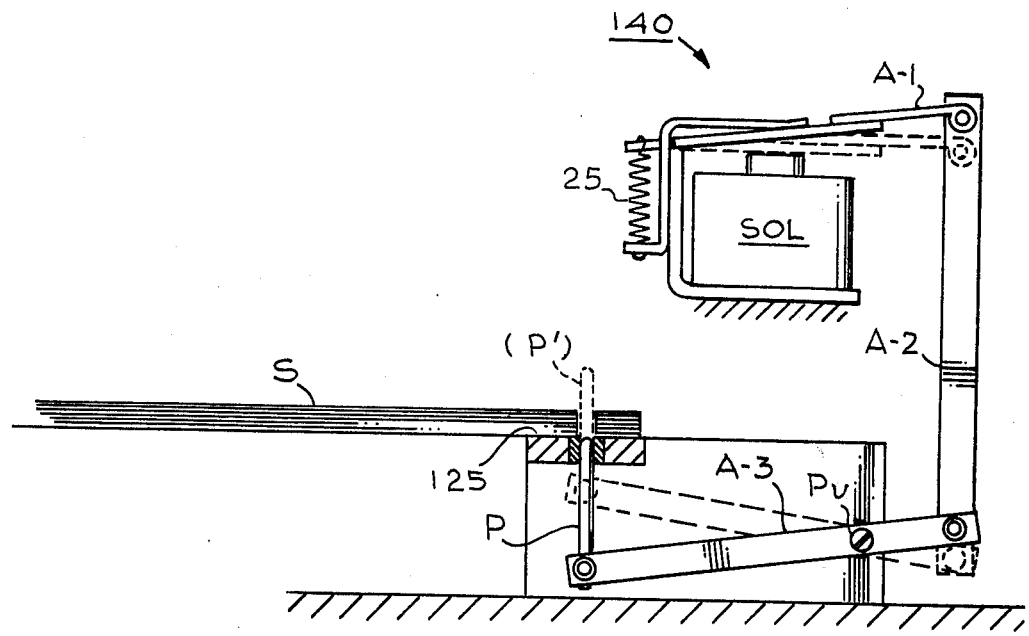

Thus, such a modified disk drive as shown in FIGS. 9 and 11, while otherwise constructed and operating as known in the art, will be understood to include modifications required in order to make advantageous use of the novel disk pack and jacket of the present invention, such as, for example: jacket-opening spreading means (FIGS. 7, 8 and 12); pack rotation (vs. disk rotation) means (FIG. 6); pack partitioning means (FIGS. 3, 6 and 11) and an associated transducer assembly (FIG. 6). The pack-rotating spindle will be understood as being controlled to rotate the pack to any one of several angular orientations (one associated with the accessing of each disk in the pack) for partitioning, and is preferably operated with a motor adapted to be stepped by prescribed precise constant increments, representing digital control signals. This facilitates precise digital control to step the pack by precise angular increments to any selected partition orientation.

The jacket or cartridge J (identified by numeral 21 in FIGS. 7 and 8) is adapted for insertion into unit 100, as indicated in FIG. 9, through a pivotable "access door" 110 to be thrust in prescribed alignment along a prescribed reference plane defined by left and right side guideways 105-R, 105-L, and forward working platform segments 125, 125', 125" to be positioned against stops 100-S, 100-S' (FIG. 10). Jacket J is obviously configured to be readily received within the disk drive so as to be held non-rotatingly in a prescribed "operating position" (e.g., there thrust against stops disposed to receive the relatively straight jacket side walls 21). Jacket J is also here shown as including a bottom-wall of roughly the same rectangular shape and width as the side walls. With jacket J thus disposed in "working position", an extended contact pad 117 will be registered with jacket slot J-S and the disk pack S within the jacket will be positioned so that its inner contact zone may be engaged for rotation between a lower rotatable spindle 109-A and an upper expansible-cone, or hub 109 (FIG. 10) adapted to be driven in idler fashion by spindle 109-A when clamped down on the pack, fitting into the hollow center of spindle 109-A, as well known in the art. Hub 109 (FIG. 10) is freely rotatable and is suspended on a clamp arm 107 of a pivotable subassembly 136 so as to be pivotable into engaging rotary-driven relation with the so-injected pack holding it on spindle 109-A. This engagement is preferably automatically invoked upon the closing of door 110 as known in the art, with a drive motor 121 being started and coupled (e.g., through a belt drive etc.) to rotate spindle 109-A at "transducing speed" (for example 360 rpm i.e., a "Low-Speed" drive).

The major components of drive unit 100 thus comprise a transducer accessing arrangement 115, (e.g., including transducer carriage 117 and translation motor 111 of FIG. 6), a pack-partitioning subassembly 140 including plunger P projectable through a bore in surface 125 (see FIG. 11), a jacket-spreading subassembly 150 including two pairs of upplungers 31-A/31-B and 33-A/33-B (FIGS. 9 and 10) projectable through bores in surfaces 125', 125", (see also FIG. 12), and the mentioned rotary drive subassembly 120 (comprising spindle motor 121, spindle 109-A and hub 109 mounted on pivot-arm 107), the entire assemblage being mounted upon a chassis 103. These mechanisms will be understood as constructed and operated in a known fashion except as otherwise described.

Thus, transducer subassembly 115 comprises a Read/Write head unit, or mount 117, normally disposed just beyond the pack and adapted to be projected inward as discussed re FIG. 6, atop a hollow threaded tube 118 threadingly engaged on a lead screw 112 adapted to be rotated endlessly in precise incremental fashion by an associated stepping motor 111. Once a pack is partitioned, this subassembly will be understood as operative to translate R/W transducer 15 onto the selected disk surface and track with shroud 13 serving to support the upper pack, guiding it over head 15 while the pack is rotated.

Access door 110 is preferably mechanically linked to the disk loading mechanism, including pivoting arm 107 and to a head/load interlock switch, so that when the door is closed, the pack-rotating spindle-hub is automatically engaged with the pack and the drive subassembly pre-disposed for rotation thereof.

The basic functions of drive unit 100 will be recognized as to receive and generate control signals, to spread the jacket and partition the pack (disk selection), to position the Read/Write head on selected tracks of the selected flexible disk and to perform transducing operations (e.g., write or read data) upon command from the data processing controller. As workers in the art well know, positioning of the Read/Write head 15 (FIG. 6) is accomplished conventionally with the lead screw drive from linear stepping motor 111, with head 15 (mounted on the carriage coupled to be translated by this lead screw) stepped-in or -out, upon command, in incremental fashion by actuation of the stepper motor, rotating the lead screw a corresponding amount.

Partitioning is effected, preferably, by a prescribed partition subassembly 140 including a select plunger (see plunger P in FIGS. 6 and 11) disposed to be thrust upward through an accommodating aperture 123 in working surface 125, upon actuation by an associated solenoid SOL. That is, as will be understood from FIG. 11, a "partition-signal" applied to energize the solenoid coil will act to pull a "clapper arm" A-1 down (against return spring 25) and throw an associated plunger-linkage (arms A-2, A-3 pivotably mounted at pivot pv on the chassis) downward and thereby thrust plunger P upward as indicated in phantom in FIG. 11. This partition assembly will be recognized as particularly compatable with the subject "floppy pack" and with unit 100 to perform the select partitioning function of the jacket-encapsulated pack in the above indicated manner.

According to a related feature, spindle drive motor 121 is adapted to rotate the pack, disposed within the jacket J and engaged between hub 109 and drive spindle 109-A, for transducing, as known in the art, as well as to shift according to a related improvement feature, into a second rotary-step mode for partition-positioning. That is, responsive to a prescribed indexing (digital) control signal, motor 121 will digitally step the spindle and pack rotationally by a prescribed precise number of integral angular increments until the selected "partition orientation" (i.e., rotation) is achieved. Thus, in effect, the pack is made to step from "zero" (or "Start Radius" see index hole) 1-Ih and axes $A_X$-1, FIG. 3 a prescribed number of "angular steps" to thereby "count" its way, digitally, to a prescribed locator hole position. Here, a plunger P may thrust the pack to partition it and expose the corresponding selected disk recording surface, as described above. For instance, in this embodiment it is convenient to step-rotate the pack 1.8° per digital "stepping pulse" using a dual mode motor, so that, with the locator holes (embodiment of FIG. 3) separated at 18° intervals, each rotary increment of 10 steps will carry the pack 18°, i.e., from one locator hole to the next.

Thereupon the transducer carriage means (see step translation motor 111) may be activated to initiate head entry into the so-partitioned pack (from an outer reference position) while the partitioning plunger P is conjunctively withdrawn. Carriage-entry will thrust the transducer down upon the selected disk surface and will allow the distal end of the transducer mount, and particularly shroud 13 mounted thereon, to contact and assume support of the upwardly-thrust portion of the pack. Shroud 13 will maintain this contact, guidingly, while the pack is rotated and the Read/Write operations are performed.

That is, stepping motor 111 will translate the transducer head into the split pack and place it in compliant "gliding" contact with the selected recording surface of the disk for transducer operation (e.g., see U.S. Pat. No. 3,810,243 for typical operations). Upon completion of the transducing operations, at one or several tracks, the head may be withdrawn and a different recording surface (disk) accessed in another partitioning cycle. The indicated novel partitioning and head mount arrangements will be seen as establishing stable, protected transducer positioning at any selected disk surface of such a flexible pack.

According to this feature, the transducer is kept disk-engaged while moving from track to track on the selected recording surface, until it is entirely disengaged and withdrawn to the outer "rest position" (FIG. 6). During partitioning and transducer entry, the rotary drive will, of course, hold the pack in fixed position, being thereafter rotated (at 360 rpm) for transducer operation with the "upper" deflected disks (above the selected one) being bent smoothly up over the mentioned shroud 13, as they pass over the transducer carriage 117.

Shroud 13 is configured, positioned and adapted, according to a related feature, to smoothly, frictionlessly guide and urge these "upper disks" (above the split) thus upward, while they are so rotated to permit the unimpeded, non-damaging entry and withdrawl of the transducer mount into, and out of, the split-pack (e.g., for Read/Write operations at different disk tracks).

Workers in the art will appreciate that with such a select/partitioning means, operable in conjunction with such a hole-encoded flexible disk pack, the pack may be split to expose any selected disk, conveniently, yet precisely—e.g., simply rotating the pack to a prescribed angular position corresponding with registry of the plunger with the associated partitioning pattern of locater-holes, then thrusting the plunger up these locator-holes sufficient to admit entry of the transducer-shroud. Thereupon the plungers are retracted and rotation of the pack may be resumed.

Thus, for instance, when the "nth" disk in a pack is selected, the pack will be rotated at "START" position (index hole reference), then stepped by (n × 18°) the angular increments corresponding with a rotation of the pack so that the associated locator-sites register with the plunger-locus. Up-thrust of the plunger will then lift all disks "above n" away from the upper surface of "n" disk, exposing the latter for transducer entry as described. For instance, as workers know, such a stepping motor/lead screw arrangement can position the transducer head on any one of about 77 discrete track positions of a disk surface. Unexpectedly the "paper thin" disks can interfit slidingly while rotating, yet appear to experience minimal frictional wear and damage at the contacting surfaces, especially when protected by the mentioned flexible inter-liner means.

AUTOMATIC IDENTIFICATION OF CARTRIDGE TYPE

FIGS. 7 and 8 illustrate a salient feature of this case whereby equipment handling cartridges (disk-in-jacket) of the subject type may be adapted to handle conventional cartridges too. Thus, jacket 21 will be understood to include an "identification-aperture means" such as registering "ID" holes 21-a, 21-a', in sides 21-T, 21-B, adapted to pass an identification-beam (here, suggested as the "ID subsystem" along the path between source S and detector D, having output terminals "d-o"—these also being schematically indicated on associated disk drive 120 in FIG. 10).

Thus, as workers will realize, when an "end-wise partitioned" cartridge, like jacket 21 with a pack inside, is inserted into the drive, the output from such an "ID subsystem" may be used to invoke associated operations peculiar thereto (e.g., endwise partitioning); while insertion of a conventional cartridge without such ID-holes would invoke more "standard" operations (e.g, for jacket with single floppy).

Figure 12:
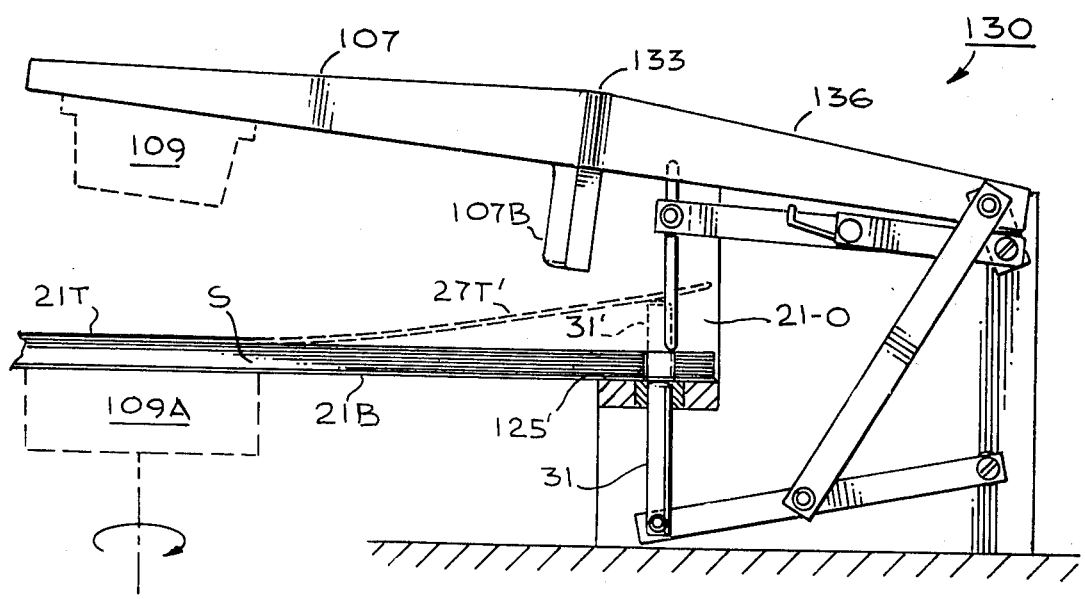
FIG. 12 is a similar view of an automatic jacket opening means likewise adapted for such a disk pack and suited for incorporation in such a drive.

JACKET SPREADING:

Drive unit 100 is provided with a jacket-opening and spreading arrangement 130 (FIGS. 9, 10 and 12) which essentially comprises a pair of upward-thrusting plungers 31-A and 31-B and a related opposed pair of downward-thrusting plungers 33-A and 33-B (see also FIG. 8) coupled to pivotable subassembly 136 so as to provide for functioning in the aforeindicated manner to automatically spread the entry slot edges of jacket J (i.e., raise flap 21-T as indicated in phantom 21-T' and 31' in FIG. 12) to accommodate the partitioning of the pack inside and the entry of the transducer carriage 117 (FIGS. 9 and 10). As mentioned previously in connection with FIG. 8, the downward-thrusting plungers 33 serve to pin the lower panel 21-B against forward guide platforms 125" and 125' to thereby hold the jacket fixed when the disk pack is rotated within the jacket.

CONCLUSION:

In summary, workers in the art will recognize that the foregoing described embodiment are well adapted to provide novel, unobvious improvements in multi-disk media, as well as associated manufacturing methods—especially for flexible disks—plus protective jacket means and disk handling means including jacket spreaders and pack-partitioning arrangements according to the invention. Workers will also recognize that, while a particular disk handling embodiment has been described, for clarity, the subject novel flexible cartridges (i.e., novel disk packs and associated jacket) are entirely feasible for use with other disk handling arrangements, especially where these include the same or similar jacket spreading and pack-partitioning means. For instance, workers will recognize that, instead of the described partitioning means operating about the circumferential periphery of the disk pack, a like arrangement may be provided to operate closer to the center of the pack such as upon like encoded holes arranged about an inner disk track.—or even produce endwise partitioning with no apertures at all through the disks and/or the intervening spacers (e.g., via air jets issuing from a modified "spindle" in the pack's center-hole —see elsewhere and in copending, commonly-assigned U.S. Ser. No. 890,799 for Jet Distributor For End-Wise Pneumatic Partitioning of Disk Pack, filed on Mar. 27, 1978, by H. U. Ragle and D. DeMoss; herein incorporated by reference). And, of course, such a jacket may accept a disk pack involving other forms of disks (e.g., other recording modes, other types of records, such as "digital music" or analog information).

That is, a series of hole-encoded collars may be substituted (no hole-encoding of disks), each supporting a respective disk in a pack and removably coupled (e.g., by key-way means) to a common hub, or spindle, with a similar plunger means being arranged to be thrust up through this stack of collars and deflect (upward) those "above" a given selected disk. Such an arrangement may be more apt for rigid disks.

Moreover, whereas the illustrative partitioning and/or jacket opening means are mechanical, it will be apparent that alternate means such as pneumatic or hydraulic partitioning means will in certain cases also serve. For instance, one could substitute a gas injection tube for the mechanical plunger of the indicated partitioning arrangement and propel a burst of pressurized gas up through a selected registered group of locator-holes, as understood and appreciated by workers, under proper circumstances to (at least partially) partition the pack sufficient to allow transducer entry–in certain cases this will even reduce associated abrasion and defacement of disk surfaces as well as accelerate partitioning. One can introduce pressurized gas from inside a spindle hub adjacent the partitioning plane so that in case the disks are not rigid enough at their periphery once their hubs are raised to the reference plane, application of a stream of pressurized gas can then proceed radially out to maintain them raised. Then, once the head enters and the turntable begins to spin, much less gas pressure would probably be required to maintain them in position above the partitioning plane as desired, and certainly in conjunction with a supporting shroud. Further, in certain cases partitioning may be effected without completely arresting the rotating disk pack (e.g., while quickly incrementing the pack in digital stepped fashion between R/W rotation sequences). Similarly, jacket spreading may be otherwise implemented within the broad confines of the described concepts, for instance, by lateral introduction of a pair of relatively horizontal vertically-expandable spreaders disposed relatively along the plane of an injected disk pack to be automatically engaged, then expanded, as the jacket is thrust into the disk drive assembly. (See also U.S. Ser. No. 890,799, cited above).

With the preferred embodiments of the invention thus described in detail, those skilled in the art will be able to contemplate certain modifications in structure and/or method over that illustrated and described, and/or contemplate the substitution of equivalent elements for some or all of those disclosed, while nontheless practicing the novel concepts described and claimed herein; accordingly, it is intended that all such modifications and substitutions be embraced insofar as they fall within the spirit and scope of the appended claims.

What is claimed is:

1. Jacket container means adapted to house a prescribed pack of flexible disk records and to accommodate the rotation and partition of the pack, within the jacket as well as accommodating the selectible introduction of transducer means to operate upon this pack, and also adapted to accommodate registration within associated automatic disk drive apparatus automatically so-rotating, partitioning and transducing this pack, this said container means comprising: a pair of like panel means joined along two opposing edges
   by a pair of like side-wall means and further joined along an intermediate bottom-edge by bottom-wall means;
   said wall means all being dimensioned and adapted to accommodate the full partitioned height of said pack when so operated in situ and also being configured and adapted to be automatically non-rotatably positioned in said apparatus for automatically carrying out said operations.

2. The combination as recited in claim 1, wherein said container means also includes sealing means along a mouth edge opposite said bottom-edge and is adapted to accommodate associated spreading means for automatically opening and unsealing said sealing means so as to admit said transducing means for operation upon the pack contained within.

3. The combination as recited in claim 2, wherein said container means is also adapted to be expanded with said panels being spread apart to better accommodate said rotation, partition and transducing operations, in situ and wherein said container means is also adapted to accommodate expander means adapted to automatically thrust said panel means apart for so expanding the container means.

4. The combination as recited in claim 3 wherein said wall means are made expandable along their width to accommodate said spreading means.

5. The combination as recited in claim 3 wherein said wall means are made wide enough to accommodate said rotation, partition and transducer operations of said pack in situ.

6. The combination as recited in claim 1 wherein said container means is also made normally self-sealing against the intrusion of dust and the like into the region of the pack contained within and wherein the container means is further adapted to be automatically unsealed for injection of said transducer means.

7. The combination as recited in claim 6 wherein said container means is also adapted to accommodate spreader means automatically operative to unseal said container means and admit said transducer means when the container means is inserted into said disk drive apparatus.

8. The combination as recited in claim 7 wherein said container means comprises at least one flap means along the top edge of said container means opposite said bottom-edge; said flap means being spring-urged to normaly be disposed in closed sealing condition while also adapted to accommodate spreader means to divert the flap means unsealingly.

9. The combination as recited in claim 8 wherein said container means includes holes in said panel means to accommodate such spreader means.

10. The combination as recited in claim 9 wherein said spreader means comprise a plurality of plungers adapted to be injected through said holes so as to thrust said panel means apart sufficiently to accommodate said rotation, partition and transducing operations on said pack.

11. An improved cartridge comprising a jacket container means together with partitionable pack of flexible disk records contained there within said jacket container means comprising:
a pair of like panel means joined along two opposing edges by a pair of like side-wall means and further joined along an intermediate bottom-edge by bottom-wall means;
said wall means all being dimensioned and adapted to accommodate the full partitioned height of said pack when so operated in situ and also being configured and adapted to be automatically non-rotatably positioned in said apparatus for automatically carrying out said operations.

12. The combination as recited in claim 11 wherein said pack is arranged and adapted to accommodate pneumatic partitioning.

13. Improved disk drive apparatus adapted to receive a cartridge containing a pack of floppy disk records adapted to be rotated, partitioned and transduced while held within jacket container means, said apparatus being adapted to automatically receive such cartridge and thereafter selectably and automatically invoke said rotation, partition and transducing operations while holding said jacket means in a prescribed position non-rotatably; said apparatus also including automatic jacket spreader means adapted to automatically open said jacket to accommodate said pack rotation, partition and other manipulation while also including automatic pack partition means adapted to partition said disk pack for said transducing operations.

14. An improved jacket means adapted to contain a prescribed pack of floppy disks and adapted to accommodate the rotation, partition and transducing operations associated with said pack in situ within the jacket means; said jacket means comprising a pair of like partition means joined along two side edges and along an intermediate bottom-edge, with the top edge thereof adapted to accommodate admission and extraction of said pack and of associated transducing and other apparatus, said side edges being defined by a pair of like side-walls adapted to accmmodate the full partitioned height of said pack while it is so operated within the jacket means.

15. In an improved portable recording cartridge including a pack of flexible recording disks, apt for co-rotation and endwise partitioning, jacket container means adapted to contain this pack while so-partitioned, so-rotated and otherwise manipulated, said container means comprising a pair of like panels joined along at least three sides thereof, being constructed and adapted to be automatically spread apart to accommodate manipulation of the so-contained disks.

* * * * *

UNITED STATES PATENT AND TRADEMARK OFFICE
CERTIFICATE OF CORRECTION

PATENT NO. : 4,417,289

DATED : November 22, 1983

INVENTOR(S) : Herbert U. Ragle and Dean DeMoss

It is certified that error appears in the above-identified patent and that said Letters Patent is hereby corrected as shown below:

```
Col.  2, line 21, change "especilly" to --especially--.
Col.  8, line 63, change "wil" to --will--.
Col.  9, line 12, after "axis"" insert --and--;
         line 40, change "on" to --one--.
Col. 11, line 60, change "stampling" to --stamping--.
Col. 12, line 16, change "Worker" to --Workers--.
Col. 14, line 56, change "protuberances" to --protuberance--.
Col. 15, line  2, change "dis-press" to --die-press--.
Col. 18, line 12, change "upplungers" to --up-plungers--;
         line 67, change "patable" to --patible--.
Col. 19, line 15, change "axes" to --axis--;
         line 65, change "withdrawl" to --withdrawal--.
Col. 20, line 13, change "at" to --to--.
Col. 22, line 14, change "nontheless" to --nonetheless--.
Col. 24, line 25, change "accmmodate" to --accommodate--.
```

Signed and Sealed this

Twenty-seventh Day of March 1984

[SEAL]

Attest:

GERALD J. MOSSINGHOFF

Attesting Officer

Commissioner of Patents and Trademarks